US010479345B2

(12) United States Patent
Ye

(10) Patent No.: US 10,479,345 B2
(45) Date of Patent: Nov. 19, 2019

(54) METHOD OF DECOUPLING INPUT AND OUTPUT TORQUE FOR ENGINE SPEED CONTROL AND HYBRID POWERTRAIN UTILIZING SAME

(71) Applicant: GM GLOBAL TECHNOLOGY OPERATIONS LLC, Detroit, MI (US)

(72) Inventor: Shaochun Ye, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 15/673,716

(22) Filed: Aug. 10, 2017

(65) Prior Publication Data

US 2019/0047544 A1 Feb. 14, 2019

(51) Int. Cl.
| | |
|---|---|
| *B60W 20/11* | (2016.01) |
| *B60W 20/15* | (2016.01) |
| *B60W 10/06* | (2006.01) |
| *B60W 10/08* | (2006.01) |
| *B60W 10/115* | (2012.01) |
| *B60W 20/40* | (2016.01) |
| *B60W 30/182* | (2012.01) |
| *B60W 50/00* | (2006.01) |

(52) U.S. Cl.
CPC ............ *B60W 20/11* (2016.01); *B60W 10/06* (2013.01); *B60W 10/08* (2013.01); *B60W 10/115* (2013.01); *B60W 20/15* (2016.01); *B60W 20/40* (2013.01); *B60W 30/182* (2013.01); *B60W 2050/0041* (2013.01); *B60W 2050/0075* (2013.01)

(58) Field of Classification Search
None
See application file for complete search history.

(56) References Cited

U.S. PATENT DOCUMENTS

| 4,111,073 A | * | 9/1978 | Chana | F16H 47/04 477/41 |
| 4,580,671 A | * | 4/1986 | Matsuoka | F16H 45/02 192/3.31 |
| 4,618,041 A | * | 10/1986 | Sotoyama | F16H 61/143 477/61 |
| 5,073,157 A | * | 12/1991 | Herscovici | F16H 37/084 474/237 |

(Continued)

*Primary Examiner* — Shelley Chen
(74) *Attorney, Agent, or Firm* — Quinn IP Law

(57) ABSTRACT

A method of decoupling output torque from input torque during engine speed control of a hybrid powertrain for a vehicle comprises determining, via a controller, a virtual output torque required on an output member of a multi-mode transmission given a virtual input torque commanded on an input member of the multi-mode transmission for engine speed control in a selected mode of the multi-mode transmission such that rotational speed of the output member is unchanged to prevent undesired torque variation at the output member. The controller determines the virtual output torque via a first stored transfer function relating virtual output torque to virtual input torque based on modeled physical dynamics of the vehicle driveline for the selected mode of the multi-mode transmission. A hybrid powertrain includes an engine and a hybrid transmission, and a controller that controls the hybrid transmission according to the method.

20 Claims, 4 Drawing Sheets

(56) References Cited

U.S. PATENT DOCUMENTS

| | | | | |
|---|---|---|---|---|
| 5,882,279 A | * | 3/1999 | Ueki | F16H 61/143 |
| | | | | 477/168 |
| 6,188,943 B1 | * | 2/2001 | Uchida | B60W 10/02 |
| | | | | 701/54 |
| 8,602,938 B1 | | 12/2013 | Conlon et al. | |
| 8,849,460 B2 | | 9/2014 | Ye et al. | |
| 9,037,301 B2 | | 5/2015 | Morris et al. | |
| 9,382,988 B2 | * | 7/2016 | Schoolcraft | F16H 15/52 |
| 2002/0189398 A1 | * | 12/2002 | Mu | F16H 9/12 |
| | | | | 74/665 GE |
| 2003/0183028 A1 | * | 10/2003 | Shimaguchi | F16H 3/12 |
| | | | | 74/329 |
| 2004/0127326 A1 | * | 7/2004 | Tajima | B60K 6/485 |
| | | | | 477/3 |
| 2005/0101436 A1 | * | 5/2005 | Funato | B60W 10/06 |
| | | | | 477/107 |
| 2007/0072723 A1 | * | 3/2007 | Klemen | B60K 6/365 |
| | | | | 475/5 |
| 2009/0176610 A1 | | 7/2009 | Conlon | |
| 2014/0274559 A1 | * | 9/2014 | Yanakiev | F16H 61/061 |
| | | | | 477/83 |

* cited by examiner

METHOD OF DECOUPLING INPUT AND OUTPUT TORQUE FOR ENGINE SPEED CONTROL AND HYBRID POWERTRAIN UTILIZING SAME

INTRODUCTION

Hybrid vehicles can achieve fuel efficiencies by shutting off the engine during certain operating conditions, such as when the vehicle is stopped at a red light and/or when the vehicle is cruising on the highway. When a vehicle operator demands acceleration, however, the engine is powered on to provide torque. A transition between an operating mode in which the engine is off and an operating mode in which the engine is on could cause an undesired torque bump at the drive axle absent a control scheme that mitigates the torque.

SUMMARY

A method of decoupling output torque from input torque during engine speed control of a hybrid powertrain accurately models the physical dynamics of a vehicle driveline for engine speed control events, including engine automatic starts (auto-start), engine automatic stops (auto-stop), idle speed control, engine speed governing for gear shifts, for energy efficiency optimization or otherwise. For example, the method may be used to achieve a seamless transition from an engine off mode to an engine on mode. In particular, the method comprises determining, via a controller, a virtual output torque required on an output member of a multi-mode transmission given a virtual input torque commanded on an input member of the multi-mode transmission for engine speed control in a selected mode of the multi-mode transmission such that rotational speed of the output member is "unchanged", as defined herein, to prevent undesired torque variation at the output member. The controller determines the virtual output torque via a first stored transfer function relating virtual output torque to virtual input torque based on modeled physical dynamics of the vehicle driveline for the selected mode of the multi-mode transmission.

For example, the modeled physical dynamics include spring functions, damper functions, and inertial mass values representative of components of the vehicle driveline in the selected mode, such as clutches, brakes, and shafts, a final drive, a wheel axle, etc. The modeled physical dynamics may be represented as a state space model, in which all variables affecting the physical and temporal dynamic behavior of the driveline components in response to external torques that can affect the driveline are modeled, with a different state space model for each of the modes that may be selected. The external torques include but are not limited to the virtual input torque, the virtual output torque, and the motor/generator torques.

In an aspect of the teachings, the powertrain includes an engine operatively connected to the input member. The method further comprises commanding the virtual input torque at least partially according to an engine speed profile. Stated differently, the commanded virtual input torque includes an open loop portion that results in an engine speed matching a predetermined engine speed profile (i.e., a desired change in engine speed with time), and also includes a closed-loop portion resulting from feedback control based on the error between the engine speed profile and the actual engine speed. Accordingly, the virtual input torque is partially based on the engine speed profile.

By utilizing virtual torques, the controller determines torque values for the components of interest (i.e., the input member and the output member). A different stored transfer function relates the virtual torque values at the components of interest to corresponding physical torque values of physical torque actuators that actually provide the torque, and commands the corresponding physical torques at the physical torque actuators. For example, the multi-mode transmission may include multiple motor/generators controllable to apply physical torque to respective components of the multi-mode transmission resulting in torque at the input member for engine speed control equal to the virtual input torque, and torque at the output member equal to the virtual output torque. The method thus further comprises transforming, via the controller, the virtual input torque and the virtual output torque to respective torques of the multiple motor/generators according to a second stored transfer function, and controlling the multiple motor/generators to provide the respective torques.

With the scope of the present teachings, the controller may also monitor vehicle operating conditions, and determine whether the operating conditions warrant an engine speed control event. Commanding the virtual input torque is thus done in response to determining that the operating conditions warrant an engine speed control event. Engine speed control events include including engine automatic starts (auto-start), engine automatic stops (auto-stop), idle speed control, engine speed governing for gear shifts, for energy efficiency optimization or otherwise.

In an aspect of the present teachings, the multi-mode transmission may include at least two planetary gear sets, and first and second selectively engageable torque-transmitting mechanisms. Each of the torque-transmitting mechanisms may be selectively engageable to connect a respective member of one of the planetary gear sets to another member of one of the planetary gear sets or to a stationary member. The first torque-transmitting mechanism is engaged and the second torque-transmitting mechanism is disengaged in a first operating mode of the transmission, and the second of the torque-transmitting mechanism is engaged and the first torque-transmitting mechanism is disengaged in a second operating mode of the transmission. The modeled physical dynamics of the driveline are different for the first operating mode than for the second operating mode. The torque path through the transmission is different in the different operating modes, affecting the physical loading borne by the various components. For example, the first torque-transmitting mechanism will have a different damping ability and therefore is modeled by a different damping function when engaged than when not engaged. Similarly, the first torque-transmitting mechanism will have a different spring effect when engaged than when not engaged, and the same is true of the second torque-transmitting mechanism.

In an aspect of the present teachings, the multi-mode transmission includes a first motor/generator and a second motor/generator, and is controllable by the controller to provide three electric vehicle modes. The three electric vehicle modes include a first electric vehicle mode in which the second motor/generator provides torque at the output member and the first motor/generator does not, a second electric vehicle mode in which both the first motor/generator and the second motor/generator provide torque at the output member, and a third electric vehicle mode in which the first motor/generator provides torque at the output member and the second motor/generator does not.

A hybrid powertrain for a vehicle comprises a multi-mode transmission having an input member and an output member. A controller is operatively connected to the multi-mode transmission and is configured to execute a stored algorithm that includes a first stored transfer function relating virtual output torque at the output member to virtual input torque at the input member based on modeled physical dynamics of the vehicle driveline for each selected mode of the multi-mode transmission. The stored algorithm commands the virtual input torque, and determines, via the first transfer function, the virtual output torque required on the output member given the virtual input torque commanded on the input member of the multi-mode transmission such that rotational speed of the output member is "unchanged", as defined herein, to prevent undesired torque variation at the output member. The modeled physical dynamics include spring functions, damper functions, and inertial mass values representative of components of the driveline in the selected mode. The modeled physical dynamics may be represented as a state space model.

The hybrid powertrain may further comprise an engine operatively connected to the input member. The stored algorithm may be configured to command the virtual input torque at least partially according to a predetermined speed profile of the engine. The multi-mode transmission may include multiple motor/generators controllable to apply physical torque to respective components of the multi-mode transmission resulting in torque at the input member equal to the virtual input torque for engine speed control and torque at the output member equal to the virtual output torque. The stored algorithm is configured to transform, via the controller, the virtual input torque and the virtual output torque to respective torques of the multiple motor/generators according to a second stored transfer function, and control the multiple motor/generators to provide the respective torques.

In an aspect of the present teachings, the hybrid powertrain may further comprise an engine operatively connected to the input member. The stored algorithm may be configured to monitor vehicle operating conditions, and determine that the vehicle operating conditions warrant an engine speed control event. Commanding the virtual input torque is in response to determining that the operating conditions warrant an engine speed control event.

In an aspect of the present teachings, the multi-mode transmission includes at least two planetary gear sets, a first selectively engageable torque-transmitting mechanism, and a second selectively engageable torque-transmitting mechanism. Each of the torque-transmitting mechanisms is selectively engageable to connect a respective member of one of the planetary gear sets to another member of one of the planetary gear sets or to a stationary member. The first torque-transmitting mechanism is engaged and the second torque-transmitting mechanism is disengaged in a first operating mode of the transmission, and the second of the torque-transmitting mechanism is engaged and the first torque-transmitting mechanism is disengaged in a second operating mode of the transmission.

In an aspect of the present teachings, the multi-mode transmission includes a first motor/generator and a second motor/generator, and is controllable by the controller to provide three electric vehicle modes, including a first electric vehicle mode in which the second motor/generator provides torque at the output member and the first motor/generator does not, a second electric vehicle mode in which both the first motor/generator and the second motor/generator provide torque at the output member, and a third electric vehicle mode in which the first motor/generator provides torque at the output member and the second motor/generator does not.

Within the scope of the present teachings, a vehicle comprises a hybrid powertrain that includes an engine having a crankshaft, a multi-mode transmission, and a controller. The multi-mode transmission has an input member connectable to rotate with the crankshaft, and has an output member. The controller is operatively connected to the multi-mode transmission and is configured to execute a stored algorithm that includes a first stored transfer function relating virtual output torque to virtual input torque. The first stored transfer function is based on modeled physical dynamics of a driveline of the vehicle for each selected mode of the multi-mode transmission. The modeled physical dynamics include spring functions, damper functions, and inertial mass values representative of components of the driveline in the selected mode, and are represented as a state space model. Via the stored algorithm, the controller commands the virtual input torque for engine speed control, and determines the virtual output torque required on the output member given the virtual input torque commanded on the input member for engine speed control in the selected mode of the multi-mode transmission such that rotational speed of the output member is unchanged to prevent undesired torque variation at the output member.

In an aspect of the present teachings, the stored algorithm is configured to command the virtual input torque at least partially according to a predetermined speed profile of the engine.

In an aspect of the present teachings, the multi-mode transmission includes multiple motor/generators controllable to apply physical torque to respective components of the multi-mode transmission resulting in torque at the input member equal to the virtual input torque, and torque at the output member equal to the virtual output torque. The controller is configured to transform, via the stored algorithm, the virtual input torque and the virtual output torque to respective torques of the multiple motor/generators according to a second stored transfer function, and control the multiple motor/generators to provide the respective torques.

In an aspect of the present teachings, the multi-mode transmission includes a first motor/generator and a second motor/generator, and is controllable by the controller to provide three electric vehicle modes, including a first electric vehicle mode in which the second motor/generator provides torque at the output member and the first motor/generator does not, a second electric vehicle mode in which both the first motor/generator and the second motor/generator provide torque at the output member, and a third electric vehicle mode in which the first motor/generator provides torque at the output member and the second motor/generator does not.

The above features and advantages and other features and advantages of the present disclosure are readily apparent from the following detailed description of the best modes for carrying out the disclosure when taken in connection with the accompanying drawings.

DETAILED DESCRIPTION

Figure 1:
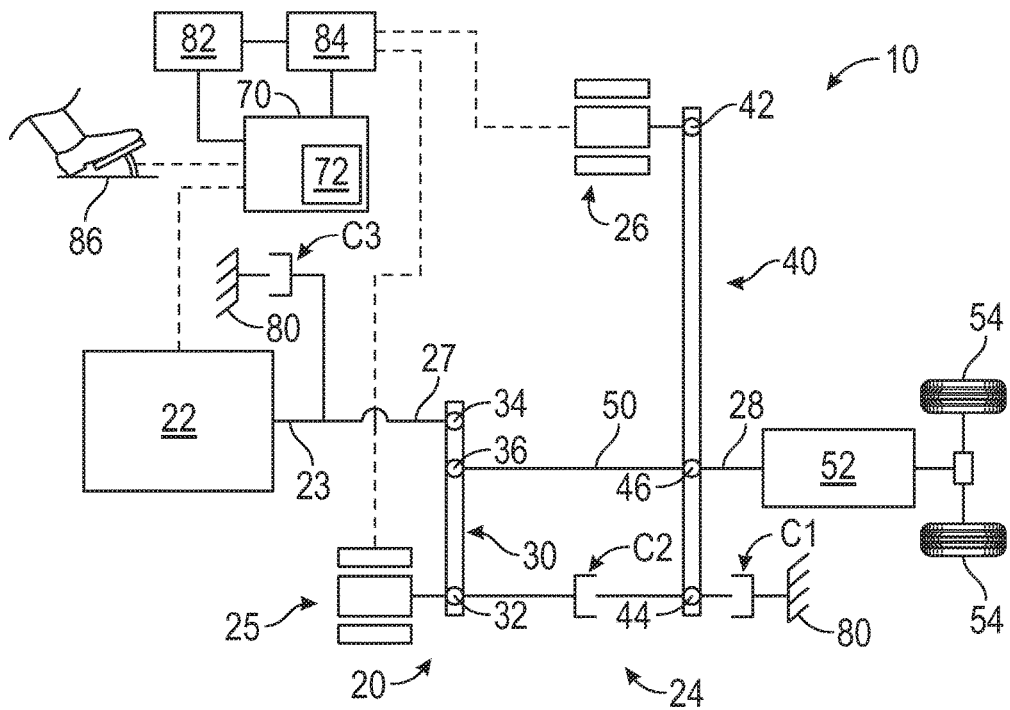
FIG. 1 is a schematic illustration of a vehicle including a hybrid powertrain with a multi-mode transmission.

Referring to the drawings, wherein like reference numbers refer to like components throughout the views, FIG. 1 shows a vehicle 10 with a hybrid powertrain 20 is illustrated in a lever diagram format. The hybrid powertrain 20 includes an internal combustion engine 22 and a hybrid transmission 24. The internal combustion engine 22 may be a gasoline engine or a diesel engine.

The hybrid transmission 24 includes a first planetary gear set 30 and a second planetary gear set 40, represented as individual levers. The first and second planetary gear sets 30, 40 are simple planetary gear sets, each with a sun gear member, a carrier member, and a ring gear member. The first planetary gear set 30 includes a sun gear member 32, a ring gear member 34, and a carrier member 36. As understood by those skilled in the art, a plurality of pinion gears supported for rotation by the carrier member 36 mesh with the ring gear member 36 and the sun gear member 32. The second planetary gear set 40 includes a sun gear member 42, a ring gear member 44, and a carrier member 46. As understood by those skilled in the art, a plurality of pinion gears supported for rotation by the carrier member 46 mesh with the ring gear member 46 and the sun gear member 42. In a lever diagram, each individual lever represents a planetary gear set or an external gear set. In the planetary gear set levers, the three basic mechanical components of the planetary gear are each represented by a node. Therefore, a simple planetary gear set lever contains three nodes: one for the sun gear member, one for the planet gear carrier member, and one for the ring gear member. The relative length between the nodes of each planetary gear set lever can be used to represent the ring-to-sun ratio of each respective gear set.

The hybrid transmission 24 also includes a first electric motor/generator 25 and a second electric motor/generator 26, each having a rotatable rotor and a stator surrounding the rotor. The rotor of the first electric motor/generator 25 is connected to rotate in unison with the sun gear member 32, and the rotor of the second electric motor/generator 26 is connected to rotate in unison with the sun gear member 42. As used herein, two components "rotate in unison" with one another when they are connected such that they rotate at the same speed as one another. As further described herein, the electric motors 25, 26 are operatively connected to an electronic controller 70 that executes a stored algorithm 72 to control the torque applied by each of the motors 25, 26 in various operating modes of the powertrain 20.

The transmission 24 has an input member 27 connected for rotation with the carrier member 34, and an output member 28 connected for rotation with the ring gear member 46. Both the input member 27 and the output member 28 are rotatable shafts. The output member 28 is connected through a final drive 52 to vehicle wheels 54 such that the powertrain 20 can provide tractive force at the wheels 54 to propel the vehicle. The engine 22 has a crankshaft 23 connected to rotate in unison with the input member 27. The carrier member 36 of the first planetary gear set 30 is connected to rotate in unison with the carrier member 46 of the second planetary gear set 40 via an interconnecting member 50 that continuously connects the carrier members 36, 46.

The hybrid transmission 24 includes three selectively engageable torque-transmitting mechanisms: a first torque-transmitting mechanism C1, a second torque-transmitting mechanism C2, and a third torque-transmitting mechanism C3. The first torque-transmitting mechanism C1 is a brake that is selectively engageable to ground the ring gear member 44 to a stationary member 80, holding the ring gear member 44 stationary (i.e., such that it cannot rotate when the brake C1 is engaged). The stationary member 80 may be a transmission housing or other component not configured to rotate. The second torque-transmitting mechanism C2 is a clutch that is selectively engageable to connect the sun gear member 32 to rotate in unison with the ring gear member 44. The third torque-transmitting mechanism C3 is a brake that is selectively engageable to ground the ring gear member 34 to the stationary member 80, holding the ring gear member 34 stationary (i.e., such that it cannot rotate when the brake C3 is engaged). The input member 27 and the crankshaft 23 also cannot rotate when the brake C3 is engaged. The brake C3 is optional, but additional operating modes are possible when the brake C3 is provided. Brake C3 may be a mechanical diode that prevents the engine 22 from rotating in one direction when it is engaged. The brake C3 may be omitted if the required level of electric performance is low, and is included when the required level of electric performance is high. The first torque-transmitting mechanism C1, the second torque-transmitting mechanism C2 and the third torque-transmitting mechanism C3 may each include one of, but are not limited to a clutch, such as for example a rotating friction clutch, a one-way clutch, a dog clutch or some other similar torque-transmitting mechanism. The first and third torque-transmitting mechanisms C1 and C3 are braking clutches and the second torque-transmitting mechanism C2 is a rotating clutch.

The motor/generators 25, 26 may receive electrical power from or provide electrical power to an energy storage device 82 such as one or more batteries or a fuel cell. The electronic controller 70 is in signal communication with the energy storage device 82 and with a power inverter 84 that is also in electrical communication with the stator portions of the motor/generators 25, 26. The controller 70 responds to a variety of input signals including vehicle speed, operator demand (such as via depression of a gas pedal 86), the level at which the battery 82 is charged and the power being provided by the engine 22. The controller 70 regulates the flow of power between the motor/generators 25, 26 and the energy storage device 82 via the inverter 84, which converts between direct current provided or utilized by the energy storage device 82 and alternating current provided or utilized by the stators of the motor/generators 25, 26.

When the first torque-transmitting mechanism C1 is engaged, the first torque-transmitting mechanism C1 provides a reaction torque to the second planetary gear set 40 to allow the second motor/generator 26 to transmit full power through the second planetary gear set 40 to the output member 28. When the engine 22 is off, i.e., is not fueled, is not running, and is at zero speed, and when the third torque-transmitting mechanism C3 is engaged, the third torque-transmitting mechanism C3 provides a reaction torque to the first planetary gear set 30 to allow the first motor/generator 25 to transmit full power through the first planetary gear set 30 to the output member 28.

The transmission 24 may operate in a fixed gear mode when the vehicle 10 is accelerating at high speeds or operating at moderately high load. When the transmission 24 is operating in the fixed gear mode, the engine 22 is operating, the third torque-transmitting mechanism C3 is disengaged, the first torque-transmitting mechanism C1 is engaged, and the second torque-transmitting mechanism C2 is engaged. When the transmission 24 is in the fixed gear mode with the engine 22 operating, i.e., the second motor/generator 25 may be used to provide power to the output member 28 or to charge the battery 82, and the first motor/generator 25 is locked out to eliminate torque dependent losses in the first motor/generator 25.

The transmission 24 may operate in a first electrically-variable transmission mode when the vehicle 10 is cruising at a steady state condition or accelerating at light load. When the vehicle 10 is cruising in a steady state condition, the powertrain 20 is typically in an overdrive condition, in which a rotational speed of the engine 22 is less than a rotational speed of the output member 28, a rotational speed of the second motor/generator 26 is low or negative, and a rotational speed of the first motor/generator 25 is greater than the rotational speed of the output member 28.

When the transmission 24 is operating in the first electrically-variable transmission mode, the engine 22 is operating, i.e., running, the first torque-transmitting mechanism C1 is disengaged, the second torque-transmitting mechanism C2 is engaged, and the third torque-transmitting mechanism C3 is disengaged. When the transmission 24 is in the first electrically variable transmission mode, the second motor/generator 26 is controlled to provide the majority of reaction torque to the engine 22, thereby allowing the first motor/generator 25 to operate at a high speed/low torque condition to minimize torque dependent losses in the first motor/generator 25.

The transmission 24 is also operable in a second electrically-variable transmission mode. When disposed in the second electrically-variable transmission mode, the engine 22 is operating, the first torque-transmitting mechanism C1 is engaged, and the third torque-transmitting mechanism C3 and the second torque-transmitting mechanism C2 are disengaged.

The transmission 24 may operate in three different electric vehicle modes (i.e., when the engine 22 is off). In a first electric vehicle mode, the vehicle 10 is operating at low speeds. When the transmission 24 is in the first electric vehicle mode, the internal combustion engine 22 is not operating, i.e., is turned off, the first torque-transmitting mechanism C1 is engaged, the second torque-transmitting mechanism C2 is disengaged, and the third torque-transmitting mechanism C3 is disengaged. When the transmission 24 is disposed in the first electric vehicle mode, the second motor/generator 26 is used to provide power to the output member 28.

In a second electric vehicle mode referred to as a dual motor electric vehicle mode, the engine 22 is not operating, the first torque-transmitting mechanism C1 and the third torque-transmitting mechanism C3 are engaged, and the second torque-transmitting mechanism C2 is disengaged. In a third electric vehicle mode, the engine 22 is not operating, the first torque-transmitting mechanism C1 and the second torque-transmitting mechanism C2 are disengaged, and the third torque-transmitting mechanism C3 is engaged.

Figure 3:
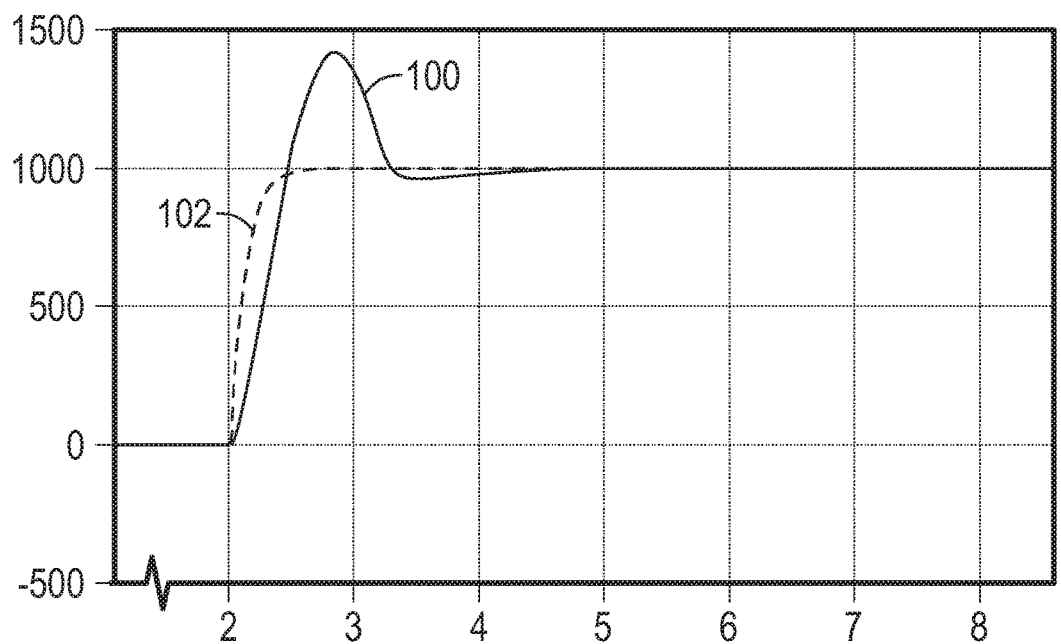
FIG. 3 is a plot of rotational speed in revolutions per second of an input member of the multi-mode transmission versus time in seconds in comparison to a predetermined engine speed profile.
Figure 4:
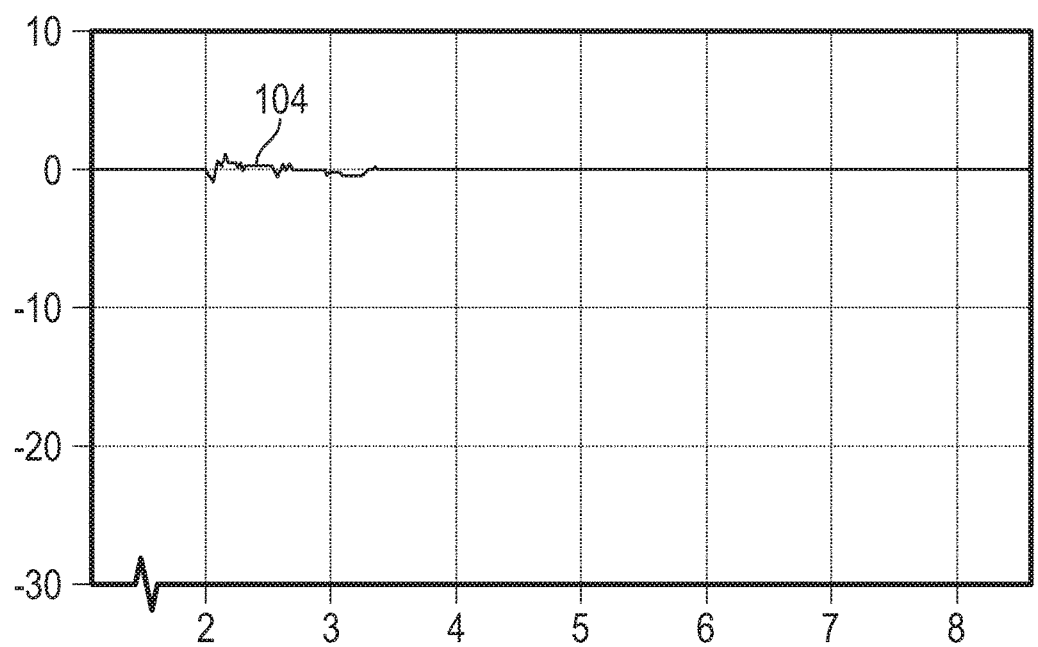
FIG. 4 is a plot of the change in speed in revolutions per second of an output member of the multi-mode transmission versus time in seconds corresponding to the plot in FIG. 3.

During an engine speed control event, such as when transitioning from one of the operating modes in which the engine 22 is off to one of the operating modes in which the engine 22 is on (i.e., powered), the controller 70 controls the operation of the motors 25, 26 to speed up the input member 27 and thus the crankshaft 23, starting the engine 22. The controller 70 executes the first stored algorithm 72 so that the rotational speed of the output member 28 is "unchanged", as defined herein, when providing torque at the input member 27 to start the engine 22. FIG. 3 shows a plot 100 of the rotational speed in revolutions per second of the input member 27 of the multi-mode transmission 24 on the Y-axis versus time in seconds on the X-axis in comparison to a plot 102 of a predetermined engine speed profile. FIG. 4 shows a plot 104 of the change in speed in revolutions per second ($\Delta N_o$) of the output member 28 of the multi-mode transmission 24 versus time in seconds corresponding to the plot in FIG. 3. As is evident in FIG. 4, a slight change in actual rotational speed of the output member 28 may occur during the control event to start the engine due to the inherent limitations of feedback to the controller 70 of the rotational speeds of the input member 27 and the output member 28, such as simulation delay, discretization effect, truncation error, etc. Accordingly, the rotational speed of the output member 28 is considered to be "unchanged" for purposes of the present disclosure if it does not change more than 5% as a result of the commanded virtual input torque, $T_{i\_virtual}$, and virtual output torque, $T_{o\_virtual}$.

Figure 2:
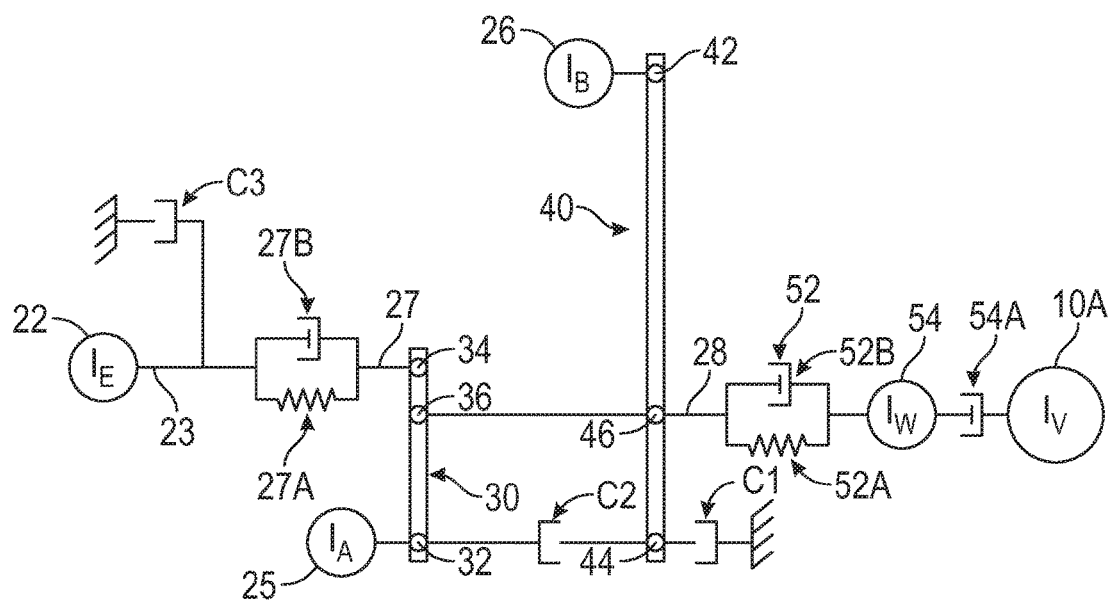
FIG. 2 is a schematic representation of a portion of the vehicle and hybrid powertrain of FIG. 1 with some components represented as springs, dampers, or inertial mass values by modeled physical dynamics.

In order to provide a ramping of engine speed 100 according to a predetermined engine speed profile 102 shown in FIG. 3 while minimizing the change in transmission output speed 104 shown in FIG. 4, the stored algorithm 72 utilizes an improved model of the dynamic physical response of the driveline (e.g., the powertrain 20, the final drive 52, the wheels 54) and the vehicle 10 as represented in FIG. 2. More specifically, the algorithm 72 more accurately models the physical dynamics of the hybrid powertrain 20 for purposes of the engine speed control event, such as to achieve a seamless transition from an engine-off operating mode to an engine-on operating mode.

The hybrid powertrain 20 includes three actual sources of torque: the engine 22, the first motor/generator 25, and the second motor/generator 26. These actual sources of torque are referred to herein as physical torque actuators. The level of torque at the input member 27 and the output member 28 are the torque levels of interest for control purposes in order to prevent the output torque bump during an engine speed control event, such as at an engine start during a mode shift. The level of torque provided at the input member 27 for engine speed control (e.g., to follow an engine speed profile during engine starting, $T_{i\_virtual}$) may not be the same as the total torque commanded at the input member 27 (e.g., a certain level of torque may be commanded at the input member 27 to prevent the engine 22 from spinning backward when the motor/generators 25, 26 are providing torque, a certain level of torque may be commanded to propel the vehicle 10 when the engine 22 is already on, etc.). Because the input member 27 and the output member 28 are not sources of torque (i.e., are not physical torque actuators), they are referred to herein as virtual torque actuators providing virtual torque. A virtual torque actuator is treated, for the purposes of a control method, as being the controlled target value and can thus be controlled under its own constraints without affecting the output of the other virtual torque actuator. Virtual torque at the input member 27 is referred to as $T_{i\_virtual}$, and is of interest to effect input speed control during engine speed control events such as engine auto-start and auto-stop operations. Virtual torque at the output member 28 is referred to as $T_{o\_virtual}$ and is of interest to manage driveline damping. The controller 70 can execute the algorithm 72 focusing on and commanding these torque levels of control interest, and then transform the virtual torques to physical torques at the motors 24, 25 according to a second transfer function relating virtual torque to physical torque.

Past attempts to eliminate torque speed bumps at the output member 28 during an engine speed control event have not related the virtual input torque $T_{i\_virtual}$ to the virtual output torque $T_{o\_virtual}$ in the manner described herein in which physical driveline dynamics are accounted for. While past attempts have considered a transfer function relating virtual input torque $T_{i\_virtual}$ to the virtual output torque $T_{o\_virtual}$ to be temporally dynamic, the driveline of the vehicle (e.g., the powertrain 20, final drive 52, wheels 54, etc.) has not been modeled in a state-space representation as a mechanically-dynamic system having spring properties, damping properties, and inertial masses that vary with time and that are dependent upon the selected operating mode of the transmission 24.

Figure 5:
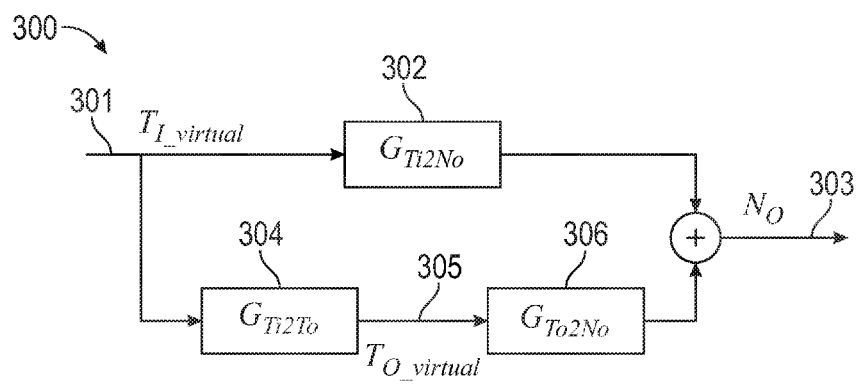
FIG. 5 is a block diagram illustrating a control scheme relating a virtual input torque at the input member with a virtual output torque at the output member to balance any change in rotational speed due to the virtual input torque.

With reference to FIG. 5, a block diagram 300 illustrates the objective of achieving no change in rotational speed $N_o$ of the output member 28 (i.e., $\Delta N_o=0$) when the controller 70 commands a given torque $T_{i\_virtual}$ (represented as control signal 301) at the input member 27. More specifically, the objective is that:

$$\Delta N_o = T_{i\_virtual} \times G_{Ti2No} T_{i\_virtual} \times G_{Ti2To} \times G_{To2No} = 0; \quad \text{[Equation 1]}$$

which yields:

$$G_{Ti2To} = -G_{Ti2No}/G_{To2No}; \quad \text{[Equation 2]}$$

where $N_O$ (represented at 303) is the rotational speed at the transmission output member 28; $\Delta N_O$ is the change in rotational speed at the transmission output member 28; $T_{i\_virtual}$ is the virtual torque at the transmission input member 27 for engine speed control; $G_{Ti2No}$, represented at box 302, is a transfer function relating $T_{i\_virtual}$ to the resulting rotational speed $N_O$ at the transmission output member 28; $G_{Ti2To}$, represented at box 304, is a first transfer function relating $T_{i\_virtual}$ to $T_{o\_virtual}$, where $T_{o\_virtual}$ (represented at 305) is the virtual torque at the transmission output member 28 required to balance $T_{i\_virtual}$; and $G_{To2No}$; represented at box 306, is a transfer function relating $T_{o\_virtual}$; virtual torque at the transmission output member 28, to rotational speed at the transmission output member 28.

The block diagram of FIG. 5 applies during an engine speed control event, such as when the transmission 24 transitions from one of the electric vehicle operating modes described above in which the engine 22 is off, to one of the operating modes requiring the engine 22 to be on, such as one of the electrically-variable operating modes. Other engine speed control events to which the block diagram of FIG. 5 include engine automatic starts (auto-start), engine automatic stops (auto-stop), idle speed control, engine speed governing for gear shifts, for energy efficiency optimization or otherwise. Box 304, the first transfer function $G_{Ti2To}$ relating $T_{i\_virtual}$ to $T_{o\_virtual}$ is based on a state space model of the physical dynamics of the vehicle driveline, including the engine 22, the powertrain 20, the final drive 52, and the wheels 54. As best shown in FIG. 2, the components of the vehicle 10 are modeled as springs, dampers, and inertial masses. For example, the engine 22 is represented as an inertial mass 1E, and the connection of crankshaft 23 to the input shaft 27 is modeled as a spring 27A and a damper 27B to represent its behavior during the given operating mode. The final drive 52 is modeled as a spring 52A and a damper 52B where it connects to the output shaft 28 to represent its behavior in the given operating mode. The rotors of the motor/generators 25, 26 are represented as respective inertial masses $I_A$, $I_B$, vehicle wheels 54 are represented as an inertial mass $I_W$, the portion 10A of the vehicle supported on the wheels 54 is represented as an inertial mass $I_V$, and the connection between the wheels 54 and the portion 10A of the vehicle supported thereon is represented as a damper 54A to represent its behavior in the given operating mode. FIG. 2 shows some of the components schematically represented as springs, dampers, and inertial masses. The components of the planetary gear sets 30, 40, the torque-transmitting mechanisms C1, C2, and C3, and the motors 25, 26 as well as housings, fluid contained in the components, etc., can also be modeled as springs, dampers, and inertial masses representing their physical dynamic behavior in the given operating mode. The actual behavior of the components when subjected to torque loads, such as their likelihood to twist, can be represented as springs, dampers, and inertial masses that affect the output torque for a given input torque differently than a system that is completely rigid.

The physical dynamics of each of the components is represented in the state space model. Each operating mode of the powertrain 20 has a unique set of equations representing the components as a state space model. The state space model has multiple variables represented as vectors within the state space, and relates the physical components by algebraic equations representing their behavior as springs, dampers, and inertial masses and also represents the temporal dynamic behavior of the components. The state space model is used in the first transfer function $G_{Ti2To}$ at box 304. The relationship between the virtual input torque $T_{i\_virtual}$ at 301 and the virtual output torque $T_{o\_virtual}$ at 305 represented by the transfer function $G_{Ti2To}$ at box 304 is thus more accurate than a transfer function relating virtual input torque to virtual output torque that models the vehicle driveline as a rigid body, accounting for temporal dynamic behavior but not physical dynamic behavior.

Figure 6:
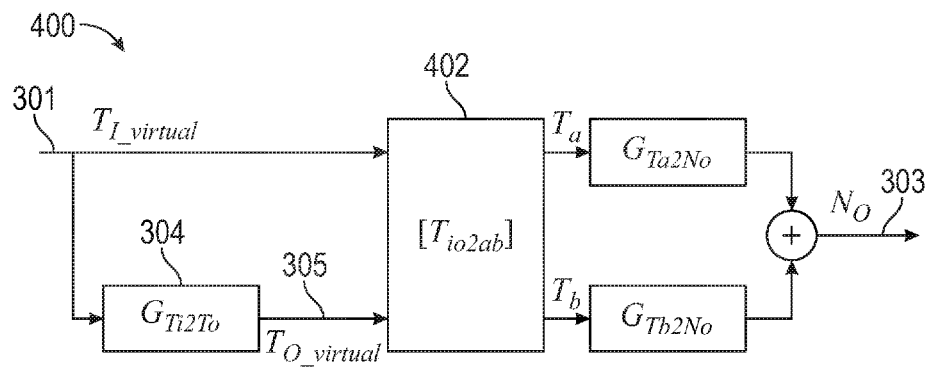
FIG. 6 is a block diagram illustrating a control scheme for controlling operation of the multi-mode transmission of FIG. 1.

With reference to FIG. 6, a block diagram illustrates a control scheme 400 to control the physical torque actuators, motors 25 and 26, to apply respective torques that result in a torque on the input member 27 equal to the virtual input torque $T_{i\_virtual}$ the portion of the torque commanded at the input member that is for engine speed control, such as to start the engine 22, or for another engine speed control event, and a torque on the output member 28 equal to the virtual output torque $T_{o\_virtual}$ such that the rotational speed $N_o$ of the output member 28 remains unchanged. The control scheme 400 employs the transfer function 304, $G_{Ti2To}$, that models the physical dynamic behavior of the components of the driveline to provide $T_{o\_virtual}$ the virtual torque at the transmission output member 28 required to balance $T_{i\_virtual}$ to result in no change in rotational speed $N_o$ at the output member 28.

In the control scheme 400, the controller 70 commands a virtual input torque $T_{i\_virtual}$ at the input member 27 for engine speed control, and determines the virtual output torque $T_{o\_virtual}$ at the output member 28. Because the input member 27 and the output member 28 are not physical torque actuators, these commanded virtual torques are transformed to corresponding torque values of the physical torque actuators, motor/generators 25, 26. More specifically, a second transfer function $T_{io2ab}$ represented at block 402 is used for this purpose.

The operation of the physical torque actuators (motor/generators 25, 26) may be described with a first system dynamics equation as follows:

$$x(k+1) = A*x(k) + B_{ab}*[u_{ab}(k)] \quad \text{[Equation 3]}$$

wherein A is an application-specific scalar vector; x(k) is a response vector for the transmission 24; $B_{ab}$ is an application-specific vector associated with the physical torque actuators; and $u_{ab}(k)$ is a control vector associated with the physical torque actuators.

The operation of the virtual torque actuators (input member 27, output member 28) may be described with a second system dynamics equation as follows:

$$x(k+1) = A*x(k) + B_{io}*[u_{io}(k)] \quad \text{[Equation 4]}$$

wherein A is the application-specific scalar vector; x(k) is the response vector for the transmission 24; $B_{io}$ is an application-specific vector associated with the virtual torque actuators; and $u_{io}(k)$ is a control vector associated with the virtual torque actuators 27, 28.

For a given system, the output or response vector x(k+1) from the virtual torque actuators (Equation. 4) is the same as the response vector x(k+1) from the physical torque actuators 25, 26 (Equation 3), and thus the terms $B_{ab}[u_{ab}(k)]$ and $B_{io}[u_{io}(k)]$ are equivalent. Both of these terms may be multiplied as follows:

$$B_{ab}^T B_{ab}[u_{ab}(k)] = B_{ab}^T B_{io}[u_{io}(k)] \quad \text{[Equation 5]}$$

wherein $B_{ab}^T$ is the $B_{ab}$ term that has been transposed.

Equation 5 may then be expressed as follows:

$$u_{ab}(k) = T_{io2ab}*u_{io}(k) \quad \text{[Equation 6]}$$

wherein $T_{io2ab}$ is a transfer function at block 402 between the virtual torque actuators and the physical torque actuators. This transfer function, $T_{io2ab}$, may be defined in accordance with the following relationship:

$$T_{io2ab} = inv(B_{ab}^T B_{ab}) B_{ab}^T B_{io} \quad \text{[Equation 7]}$$

Thus, $T_{ab2io}$, i.e., a transfer function between the physical torque actuators 25, 26 and the virtual torque actuators 27, 28, may be defined in accordance with the following relationship:

$$T_{ab2io} = inv(T_{io2ab}) \quad \text{[Equation 8]}$$

Feedback gains, $K_{ab}$ and $K_{io}$, may be defined in accordance with the following relationships:

$$K_{ab} = T_{io2ab}*K_{io} \quad \text{[Equation 9]}$$

$$K_{io} = T_{ab2io}*K_{ab} \quad \text{[Equation 10]}$$

The input matrices for the second transfer function may be defined in accordance with the following relationships:

$$B_{io} = B_{ab}*T_{io2ab} \quad \text{[Equation 11]}$$

$$B_{ab} = B_{io}*T_{ab2io} \quad \text{[Equation 12]}$$

Thus, the control vector for the physical torque actuators can be transformed to a control vector for the virtual torque actuators using a transformation matrix or transfer function, shown as follows:

$$u_{ab}(k) = T_{io2ab}*u_{io}(k) \quad \text{[Equation 13]}$$

wherein $$T_{io2ab} = inv(B_{ab}^T B_{ab}) B_{ab}^T B_{io} \quad \text{[Equation 14]}$$

The transformation matrix or transfer function $T_{io2ab}$ transforms the dynamic system from one which uses the physical motor/generators 25, 26 as actuators to one which uses virtual torque actuators applied at selectable points (input member 27, output member 28) in the driveline.

Referring to FIG. 3, the commanded virtual input torque $T_{i\_virtual}$ varies with time to cause the rotational speed 102 of the crankshaft 23 to follow the engine speed profile 100 as closely as possible. The commanded virtual output $T_{o\_virtual}$ results in rotational speed $N_o$ of the output member 28 being unchanged, as defined herein, as indicated in FIG. 4.

Figure 7:
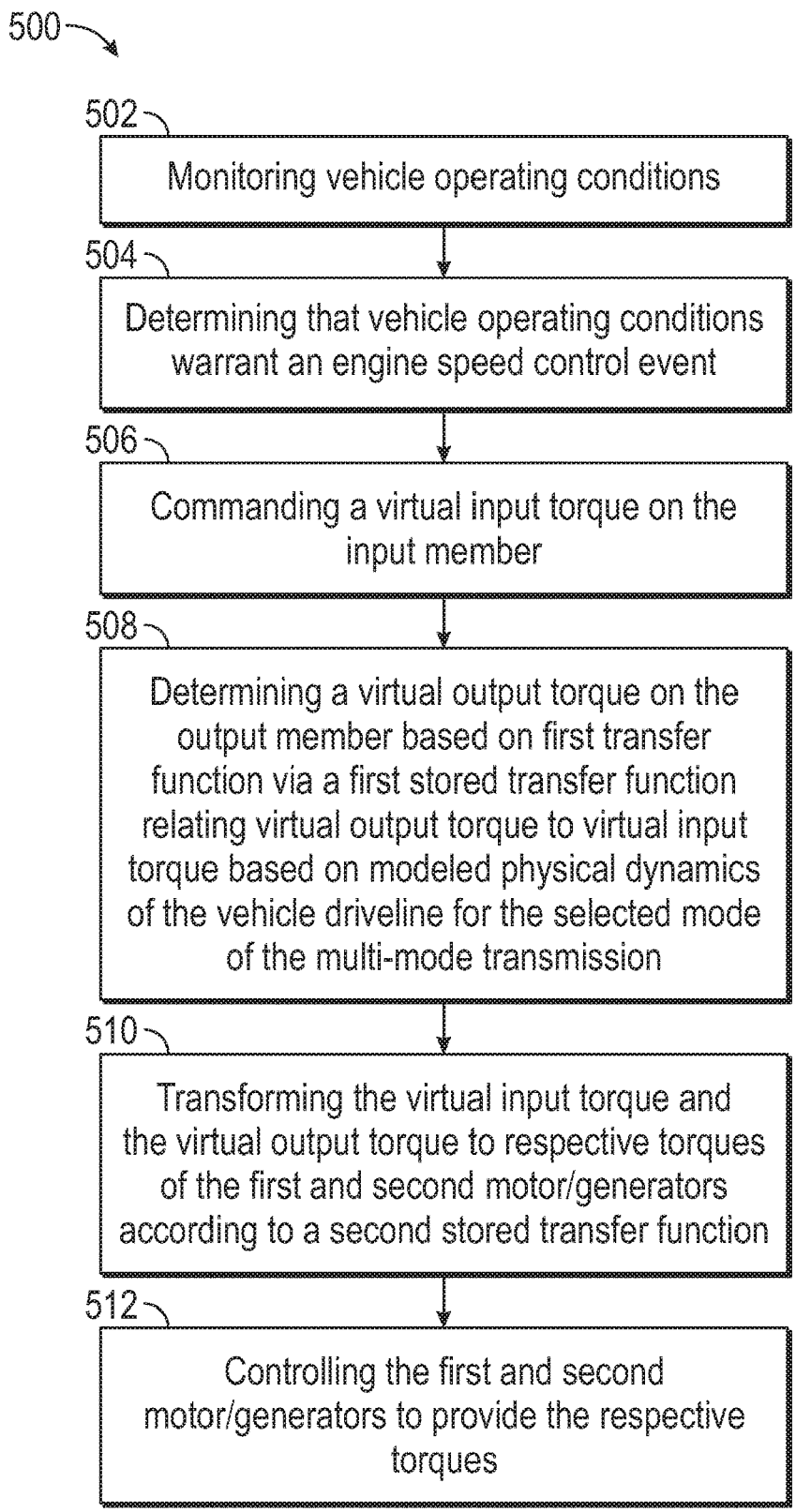
FIG. 7 is a flow chart illustrating a method of controlling the hybrid powertrain of FIG. 1.

With reference to FIG. 7, a flow diagram represents a method 500 showing actions carried out by the controller 70 to execute the control scheme 400 for ensuring that rotational speed of the output member 28 remains unchanged when torque is provided at the transmission input member 27 for an engine speed control event, such as when the transmission input member 27 speeds up the engine crankshaft 23 during change to a mode requiring an engine start. In particular, the method 500 comprises block 502, monitoring vehicle operating conditions. This may be done with various speed sensors on shafts or other rotatable components of the hybrid powertrain 20, with a position sensor on the gas pedal and/or on the brake, or by other suitable means.

In block 504, the controller 70 then determines from the monitored vehicle operating conditions that an engine speed control event is warranted (e.g., a mode change is required from a mode in which the engine 22 is off to a mode in which the engine 22 is on).

In block 506, the controller 70 commands a virtual input torque $T_{i\_virtual}$ on the input member 28 for engine speed control (e.g., at least partially to follow a predetermined engine speed profile). In block 508, using the first stored transfer function 304, the controller 70 determines the virtual output torque $T_{o\_virtual}$. The first stored transfer function 304, $G_{Ti2To}$, relates virtual output torque $T_{o\_virtual}$ to virtual input torque $T_{i\_virtual}$ based on modeled physical dynamics of the vehicle driveline for the selected mode of the multi-mode transmission. For example, the modeled driveline dynamics include spring functions, damper functions, and values of inertial masses representative of components of the multi-mode transmission in the selected mode, such as clutches, brakes, and shafts. Other driveline components, such as a final drive, a wheel axle, etc. may also be dynamically modeled. The modeled driveline dynamics may comprise a state space model, in which variables affecting the dynamic behavior of the driveline components in response to the virtual input torque are modeled, with a different set of equations for each of the modes that may be selected.

In block 510, the controller 70 transforms the virtual input torque $T_{i\_virtual}$ and the virtual output torque $T_{o\_virtual}$ to respective torques of the first and second motor/generators 25, 26 according to the second stored transfer function $T_{io2ab}$. In block 512, the controller 70 then controls the first and second motor/generators 25, 26 to provide the respective torques. For example, the controller 70 may communicate with a motor controller (not shown) that controls the power provided to either or both of the motor/generators 25, 26 from the energy storage device 80, or the electrical power received from either of the motor/generators 25, 26 when controlled to operate as a generator.

While the best modes for carrying out the disclosure have been described in detail, those familiar with the art to which this disclosure relates will recognize various alternative designs and embodiments for practicing the disclosure within the scope of the appended claims.

What is claimed is:

1. A method of decoupling output torque from input torque during engine speed control of a hybrid powertrain for a vehicle, the method comprising:
   determining via a controller a virtual output torque required on an output member of a multi-mode transmission given a virtual input torque for engine speed control commanded on an input member of the multi-mode transmission in a selected mode of the multi-mode transmission such that rotational speed of the output member is unchanged to prevent undesired torque variation at the output member; and
   wherein the determining of the virtual output torque is via a first stored transfer function relating virtual output torque to virtual input torque, and the first stored transfer function is based on modeled physical dynamics of a driveline of the vehicle for the selected mode of the multi-mode transmission.

2. The method of claim 1, wherein the modeled physical dynamics of the driveline include spring functions, damper functions, and inertial mass values representative of components of the driveline in the selected mode.

3. The method of claim 2, wherein the modeled physical dynamics of the driveline are represented as a state space model.

4. The method of claim 1, wherein the powertrain includes an engine operatively connected to the input member, the method further comprising:
   commanding the virtual input torque at least partially according to an engine speed profile.

5. The method of claim 4, wherein the multi-mode transmission includes multiple motor/generators controllable to apply physical torque to respective components of the multi-mode transmission resulting in torque at the input member equal to the virtual input torque, and torque at the output member equal to the virtual output torque, the method further comprising:
   transforming, via the controller, the virtual input torque and the virtual output torque to respective torques of the multiple motor/generators according to a second stored transfer function; and
   controlling the multiple motor/generators to provide the respective torques.

6. The method of claim 4, wherein the powertrain includes an engine operatively connected to the input member, and further comprising:
   monitoring vehicle operating conditions;
   determining that the vehicle operating conditions warrant an engine speed control event; and
   wherein the commanding the virtual input torque is in response to determining that the vehicle operating conditions warrant an engine start event.

7. The method of claim 1, wherein the multi-mode transmission includes at least two planetary gear sets, a first selectively engageable torque-transmitting mechanism, and a second selectively engageable torque-transmitting mechanism;
   wherein each of the torque-transmitting mechanisms is selectively engageable to connect a respective member of one of the planetary gear sets to another member of one of the planetary gear sets or to a stationary member; and
   wherein the first torque-transmitting mechanism is engaged and the second torque-transmitting mechanism is disengaged in a first operating mode of the transmission, and the second of the torque-transmitting mechanism is engaged and the first torque-transmitting mechanism is disengaged in a second operating mode of the transmission.

8. The method of claim 7, wherein the multi-mode transmission includes a first motor/generator and a second motor/generator, and is controllable by the controller to provide three electric vehicle modes, including a first electric vehicle mode in which the second motor/generator provides torque at the output member and the first motor/generator does not, a second electric vehicle mode in which both the first motor/generator and the second motor/generator provide torque at the output member, and a third electric vehicle mode in which the first motor/generator provides torque at the output member and the second motor/generator does not.

9. A hybrid powertrain for a vehicle comprising:
   a multi-mode transmission having an input member and an output member;
   a controller operatively connected to the multi-mode transmission and configured to execute a stored algorithm that includes a first stored transfer function relating virtual output torque to virtual input torque, and the first stored transfer function is based on modeled physical dynamics of a driveline of the vehicle for each selected mode of the multi-mode transmission;
   wherein, via the stored algorithm, the controller:
      commands the virtual input torque; and
      determines the virtual output torque required on the output member given the virtual input torque commanded on the input member for engine speed control in the selected mode of the multi-mode transmission such that rotational speed of the output member is unchanged to prevent undesired torque variation at the output member.

10. The hybrid powertrain of claim 9, wherein the modeled physical dynamics include spring functions, damper functions, and inertial mass values representative of components of the driveline in the selected mode.

11. The hybrid powertrain of claim 10, wherein the modeled physical dynamics are represented as a state space model.

12. The hybrid powertrain of claim 9, further comprising:
   an engine operatively connected to the input member; and
   wherein the stored algorithm is configured to command the virtual input torque at least partially according to a predetermined speed profile of the engine.

13. The hybrid powertrain of claim 9, wherein the multi-mode transmission includes multiple motor/generators controllable to apply physical torque to respective components of the multi-mode transmission resulting in torque at the input member equal to the virtual input torque, and torque at the output member equal to the virtual output torque; and
   wherein the controller is configured to:
      transform, via the stored algorithm, the virtual input torque and the virtual output torque to respective torques of the multiple motor/generators according to a second stored transfer function; and
      control the multiple motor/generators to provide the respective torques.

14. The hybrid powertrain of claim 9, further comprising:
   an engine operatively connected to the input member and wherein the stored algorithm is configured to:
      monitor vehicle operating conditions;
      determine that the vehicle operating conditions warrant an engine speed control event; and
      wherein the commanding the virtual input torque is in response to determining that the vehicle operating conditions warrant an engine speed control event.

15. The hybrid powertrain of claim 9, wherein the multi-mode transmission includes at least two planetary gear sets, a first selectively engageable torque-transmitting mechanism, and a second selectively engageable torque-transmitting mechanism;
- wherein each of the torque-transmitting mechanisms is selectively engageable to connect a respective member of one of the planetary gear sets to another member of one of the planetary gear sets or to a stationary member; and
- wherein the first torque-transmitting mechanism is engaged and the second torque-transmitting mechanism is disengaged in a first operating mode of the transmission, and the second of the torque-transmitting mechanism is engaged and the first torque-transmitting mechanism is disengaged in a second operating mode of the transmission.

16. The hybrid powertrain of claim 15, wherein the multi-mode transmission includes a first motor/generator and a second motor/generator, and is controllable by the controller to provide three electric vehicle modes, including a first electric vehicle mode in which the second motor/generator provides torque at the output member and the first motor/generator does not, a second electric vehicle mode in which both the first motor/generator and the second motor/generator provide torque at the output member, and a third electric vehicle mode in which the first motor/generator provides torque at the output member and the second motor/generator does not.

17. A vehicle comprising:
- a hybrid powertrain including:
  - an engine having a crankshaft;
  - a multi-mode transmission having an input member connectable to rotate with the crankshaft, and having an output member; and
  - a controller operatively connected to the multi-mode transmission and configured to execute a stored algorithm that includes a first stored transfer function relating virtual output torque to virtual input torque, and the first stored transfer function is based on modeled physical dynamics of a driveline of the vehicle for each selected mode of the multi-mode transmission;
- wherein the modeled physical dynamics include spring functions, damper functions, and inertial mass values representative of components of the driveline in the selected mode, and are represented as a state space model;
- wherein, via the stored algorithm, the controller:
  - commands the virtual input torque; and
  - determines the virtual output torque required on the output member given the virtual input torque commanded on the input member for engine speed control in the selected mode of the multi-mode transmission such that rotational speed of the output member is unchanged to prevent undesired torque variation at the output member.

18. The vehicle of claim 17, wherein the stored algorithm is configured to command the virtual input torque at least partially according to a predetermined speed profile of the engine.

19. The vehicle of claim 17, wherein the multi-mode transmission includes multiple motor/generators controllable to apply physical torque to respective components of the multi-mode transmission resulting in torque at the input member equal to the virtual input torque, and torque at the output member equal to the virtual output torque; and
- wherein the controller is configured to:
  - transform, via the stored algorithm, the virtual input torque and the virtual output torque to respective torques of the multiple motor/generators according to a second stored transfer function; and
  - control the multiple motor/generators to provide the respective torques.

20. The vehicle of claim 19, wherein the multi-mode transmission includes a first motor/generator and a second motor/generator, and is controllable by the controller to provide three electric vehicle modes, including a first electric vehicle mode in which the second motor/generator provides torque at the output member and the first motor/generator does not, a second electric vehicle mode in which both the first motor/generator and the second motor/generator provide torque at the output member, and a third electric vehicle mode in which the first motor/generator provides torque at the output member and the second motor/generator does not.

* * * * *